Nov. 5, 1968 L. R. ALLEN 3,409,468

METHOD OF MAKING A NIOBIUM STANNIDE COATED NIOBIUM WIRE

Filed Jan. 26, 1966

INVENTOR

Lloyd R. Allen

BY

Oliver W. Hayes

Edward A. Gordon

United States Patent Office 3,409,468

Patented Nov. 5, 1968

3,409,468

METHOD OF MAKING A NIOBIUM STANNIDE COATED NIOBIUM WIRE

Lloyd R. Allen, Belmont, Mass., assignor to National Research Corporation, Cambridge, Mass., a corporation of Massachusetts Continuation-in-part of application Ser. No. 104,730, Apr. 21, 1961. This application Jan. 26, 1966, Ser. No. 532,496

1 Claim. (Cl. 117—231)

This application is a continuation in part of applications, S.N. 208,937, filed July 10, 1962 and now Patent No. 3,310,862; S.N. 364,176, filed May 1, 1964 and now Patent No. 3,346,467; and of application S.N. 133,653, filed Aug. 24, 1961 and now abandoned, which is a continuation-in-part of application S.N. 104,730, filed Apr. 21, 1961, now abandoned.

The present invention relates to the production of elongated superconductors such as superconductive wire, in round or flat wire form (i.e. foil) and wide superconductive strip and particularly to the formation of superconductive wire and the like utilizing the superconductive properties of niobium stannide.

U.S. Patent 3,181,936 discloses a coating-diffusion method for achieving this general purpose. A layer of tin is deposited on a niobium wire. The coated wire is heated to form a diffusion coating of niobium stannide at the niobium surface. The resultant product is bendable for forming into electromagnet coils and the like.

However, only very low critical currents are obtainable with the form of coating-diffusion method disclosed in the said patent. I have discovered that the critical current performance can be improved substantially if the process is modified.

The difficulty with the prior coating-diffusion process for making niobium stannide superconductive wires is that the diffusion process involves heating to a temperature on the order of about 1000° C. The tin coating melts at about 300° C. and as the temperature is increased the molten tin pulls into separate areas and wets the surface poorly. As a result, substantial non-uniformity occurs in the final niobium stannide layer and only low critical currents are obtained.

Oxide layers on the niobium wire prevent the tin from wetting the niobium evenly during the diffusion step. I defeat this problem in the present invention by chemically removing the oxide to produce a wettable tin surface. This removal may be accomplished during the coating step or during the diffusion step.

In accord with a first species of my invention, I dip the niobium wire in a tin bath maintained at about 900° C. A coating quickly builds on the niobium wire. It has been observed that at least some of the oxide is reduced to tin oxide and floats to the surface of the tin melt. It is believed that oxide also diffuses inwardly to leave a clean niobium surface which is readily wettable during the subsequent diffusion step. After this initial coating of tin is applied, it can be supplemented by more tin applied through electroplating. The hot dipped niobium provides an excellent surface for the build-up of more tin. In accord with a second species of the invention, I introduce a chemical flux either into a tin bath or into a solid tin foil which is laminated with a niobium flat wire.

It is therefore the object of the invention to provide an improved coating-diffusion process for the production of niobium stannide superconductors characterized by a high critical current capacity in the resultant product.

For a fuller understanding of the nature and objects of the invention, reference should be had to the following detailed description taken in connection with the accompanying drawings wherein.

Figure 1:
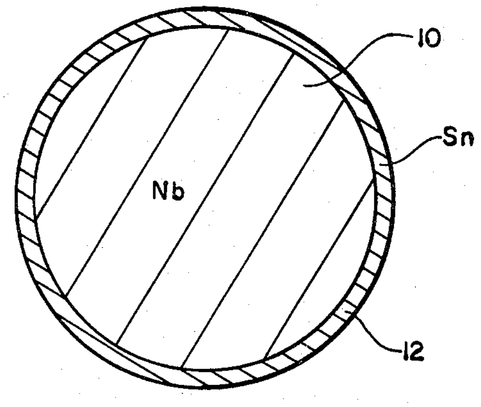
FIG. 1 is a diagrammatic, schematic, partially-sectional view of one embodiment of the invention.
Figure 2:
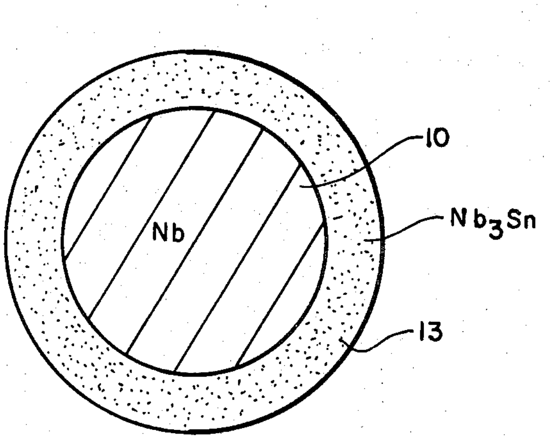
FIG. 2 is a diagrammatic, schematic, partially-sectional view of another embodiment of the invention showing complete diffusion of the tin layer.
Figure 3:
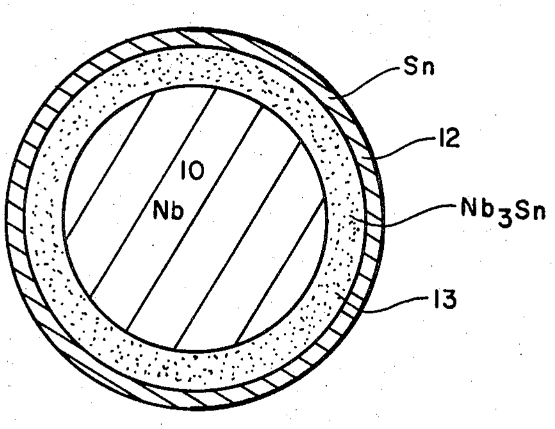
FIG. 3 is a diagrammatic, schematic, partially-sectional view of another embodiment of the invention showing partial diffusion of the tin layer.

In FIG. 1 there is illustrated a wire 10 formed of niobium having a layer 12 of tin on the outside thereof. In one preferred embodiment of the invention the layer of tin is about .0009 inch thick. In FIG. 2 the same wire 10 is illustrated after diffusion treatment at a temperature of 900° C. for a time of 16 hours. The tin layer 12 has essentially disappeared and is replaced by the reactive diffusion layer stratum 13 of $Nb_3Sn$. This stratum 13 is on the order of .00075 inch thick. In FIG. 3 is shown a product similar to the product of FIG. 2 except that the diffusion was stopped after 10 minutes so that a portion of the tin layer 12 still remains on the outside of the wire. In this case the diffusion of tin inwardly has created a $Nb_3Sn$ stratum which is only .0005 inch thick between the remaining portion of the tin layer 12 and the unreacted niobium wire core.

One preferred method of practicing the invention is set forth in the following nonlimiting example:

Example 1

A length of niobium wire 0.01 inch thick is cleaned by dipping in a bath consisting of sulfuric acid and water, the bath being at a temperature of 80° C. Thereafter, the cleaned niobium wire is drawn through a bath of molten tin at a temperature of about 900° C. to deposit on the surface of the niobium wire a tin coating of about 0.0011 inch thick. The resultant tin-coated wire is then placed in a vacuum furnace and heated to a temperature of 900° C. and at a pressure of about 10 microns Hg abs. It is held at this temperature for approximately 18 hours and then cooled to room temperature. This wire is still flexible and can be formed into a coil.

The wire was superconductive and had a maximum critical current of between 50 to 60 amps at 4° K. for a zero magnetic field. By critical current is meant the highest current which can be carried by the wire without any detectable resistance. The wire was sectioned, polished and analyzed metallographically. This wire had the appearance schematically indicated in FIG. 2, the surface stratum of $Nb_3Sn$ being on the order of 0.0008 inch thick.

The 900° C. hot tin bath provides for the best plating speeds in continuous coating operations. It is possible to get a wettable niobium surface at temperatures as low as 550° C. (under vacuum), but impractically long coating time would be required. At temperatures on the order of 1100° C. and above too much niobium would be consumed. As pointed out in my above-cited copending application 364,176, the niobium wire should be preheated before dipping if the bath temperature is less than 800° C. Once an adherent dip coat is formed, the coating can be built up by other methods. The niobium wire to be coated can be a flat wire or can be flattened after coating. Other elements may be substituted for tin in the lattice, as taught in the work of Saur, copending application S.N. 307,896, filed Sept. 10, 1963 and now Patent No. 3,244,490. This can be accomplished by dissolving alloying additions in the molten tin 10 (FIG. 1). It is also possible to strengthen the niobium substrate without adversely affecting the formation of an intermetallic superconductive coating or the ductility of the final coated ribbon. For instance, 1–5% by weight of zirconium or titanium can be alloyed with niobium in forming the original wire to be coated.

Another species of my invention for chemically improving the wettability of the niobium is to provide a superior reducing agent at the niobium-tin interface. The suitable reducing agents are the alkaline earth metals, rare earth metals and their compounds. This can be done by incorporating the reducing agent in the tin bath where dip coating is used or by forming a foil of tin-reducing agent which is laminated with a niobium flat wire as shown in the following non-limiting example:

Example 2

An alloy consisting of 2% magnesium and the remainder tin was prepared in a vacuum furnace and then rolled into thin foil. The resultant foil was sandwiched between two sheets of niobium foil, each .002" thick. The sandwich was heat treated in a vacuum furnace at 970° C. for 90 minutes. A sample .059" wide was cut from the sandwich and tested for critical current in a magnetic field of 13 kilogauss at liquid helium temperatures. The observed critical current was 60 amperes.

The mechanism of this treatment is believed to be a chemical reaction of the magnesium with the oxide layer on the niobium, thereby cleaning the niobium surface so that the tin will wet it at elevated temperature to form a uniform layer bonded to the niobium. This bond withstands subsequent heat treatment to permit the formation of a uniform layer of $Nb_3Sn$ at the niobium tin interface. Excess magnesium distills off in the subsequent vacuum treatment and does not affect superconductivity of the finished product. Other reducing agents can be used in place of magnesium. The elements of Group II of the Periodic Table, the alkaline earth metals, and their compounds are preferred.

It would also be thermodynamically feasible to use Mischmetall, a commercially available mixture of rare earths. As for alkaline earth compounds, silicides are especially preferred. The compounds MgSi and CaSi are widely used reducing agents. In this particular case, any of the compound $Nb_3Si$ which may be incidentally formed in addition to alkaline earth oxides in the course of the reducing reaction would not be harmful. Indeed, $Nb_3Si$ is also a superconductor having properties similar to those of $Nb_3Sn$.

What is claimed is:

1. An improved coating-diffusion process for the production of long wires and the like containing a continuous layer of superconductive niobium stannide comprising the steps of dipping an elongated niobium wire or the like into a molten tin bath maintained at about 900° C. to deposit a layer consisting essentially of tin on the support and heating the coated wire for a sufficient time to cause interdiffusion of said tin and niobium in a surface layer of the wire and reaction of the tin and niobium to form a continuous path of superconductive niobium stannide.

References Cited

UNITED STATES PATENTS

| | | | |
|---|---|---|---|
| 3,181,936 | 5/1965 | Denny et al. | 29—194 |
| 3,252,832 | 5/1966 | Saur | 117—231 |
| 3,296,684 | 1/1967 | Allen et al. | 27—194 |
| 3,310,862 | 3/1967 | Allen | 29—194 |
| 2,216,928 | 10/1940 | Wilson | 148—24 |
| 3,216,851 | 11/1965 | Baranow et al. | 117—114 |
| 3,217,405 | 11/1965 | Das | 29—528 |

OTHER REFERENCES

Saur et al.: "Die Naturwisserschaften," 1962, No. 6 (Jg. 49), pp. 127 and 128.

WILLIAM L. JARVIS, *Primary Examiner.*